INVENTORS
EDWIN A. BIERWIRTH
HERMAN J. KIENLE
BY Whittemore Hulbert & Belknap
ATTORNEYS Aug. 3, 1937.  E. A. BIERWIRTH ET AL  2,088,992
METHOD OF MAKING VEHICLE WHEELS
Filed Sept. 16, 1936  2 Sheets-Sheet 2

INVENTORS
EDWIN A. BIERWIRTH
BY  HERMAN J. KIENLE
ATTORNEYS

Patented Aug. 3, 1937

2,088,992

UNITED STATES PATENT OFFICE 2,088,992

METHOD OF MAKING VEHICLE WHEELS

Edwin A. Bierwirth and Herman J. Kienle, Detroit, Mich., assignors to Kelsey-Hayes Wheel Company, Detroit, Mich., a corporation of Delaware Application September 16, 1936, Serial No. 101,170

7 Claims. (Cl. 29—159.01)

The invention relates to the manufacture of vehicle wheels of that type in which the wheel center for connecting the rim to the hub is formed of pressed sheet metal. In the present state of the art of automobile manufacture, the wheels form elements in the general ornamental design of the car and are required to have a certain predetermined appearance. It is therefore the problem of the wheel manufacturer to obtain the best mechanical construction and the one which can be most easily manufactured under the limitations prescribed by the design. The present invention may be considered as a modification of a dished disk wheel which, however, is so fashioned as to produce the appearance of a spoked wheel. The invention therefore consists in the novel method of forming such wheel as hereinafter set forth.

Figure 1:
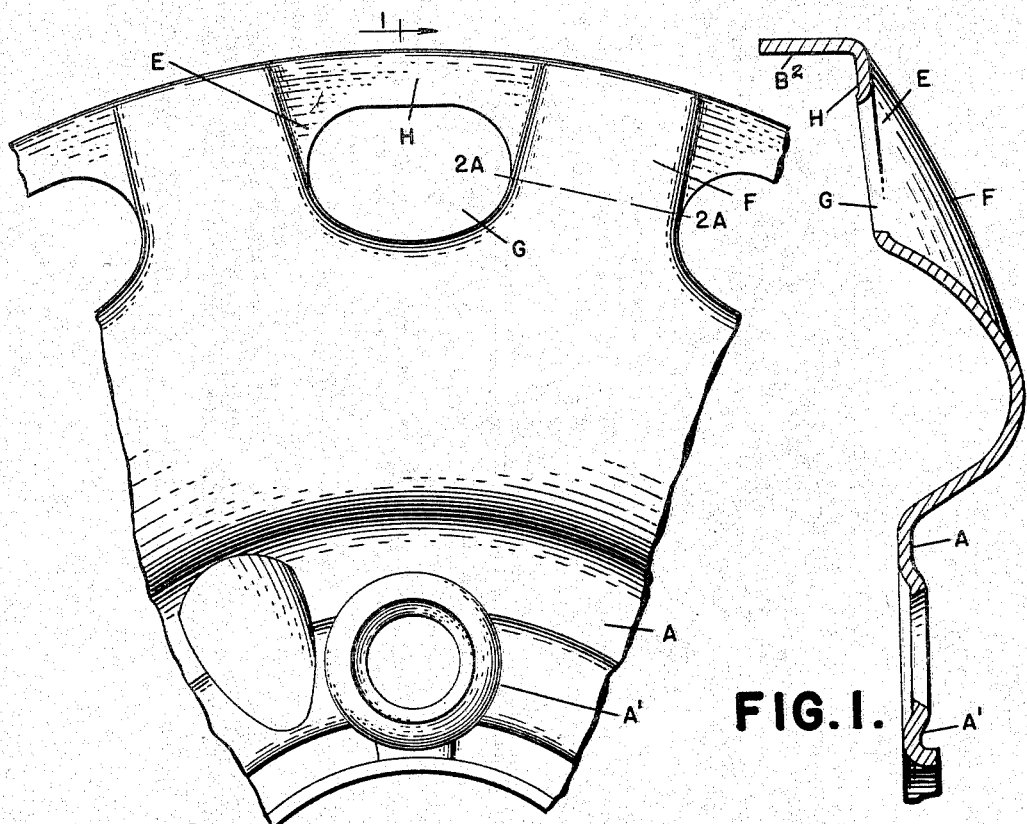
Figure 1 is a radial cross section through a wheel center as formed by our improved method on line 1—1 of Figure 2.
Figures 2, 2A:
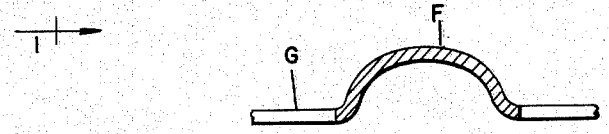
Figure 2 is a front elevation of a segment of this structure.
Figure 2A is a cross section on line 2A—2A, Figure 2.
Figure 3:
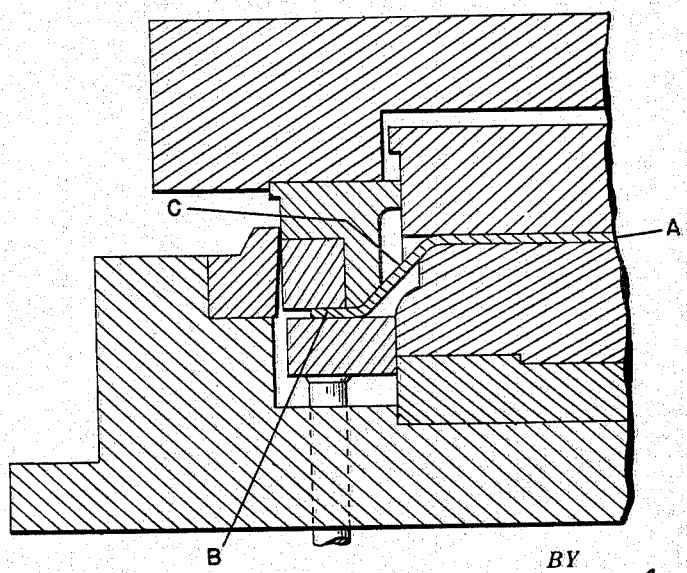
Figure 3 is a cross section illustrating the first step of the forming process.
Figure 4:
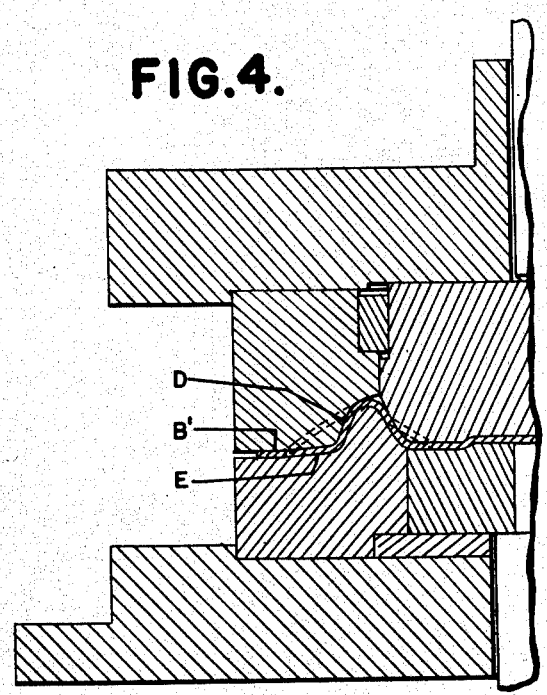
Figures 4, 5, 6 and 7 are similar views showing successive steps.
Figure 5:
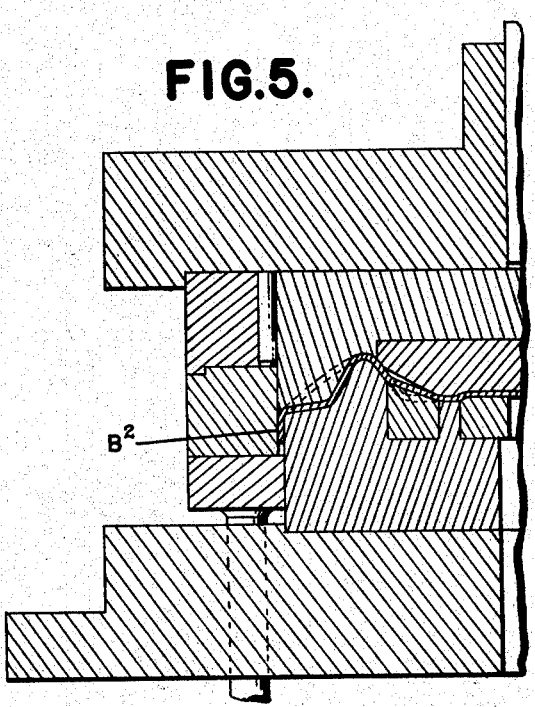
Figure 6:
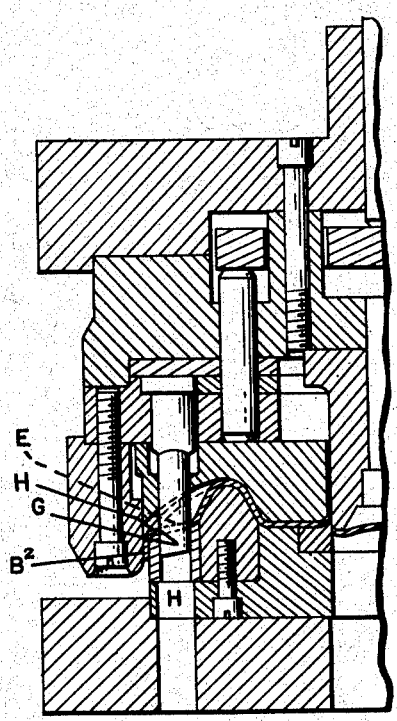
Figure 7:
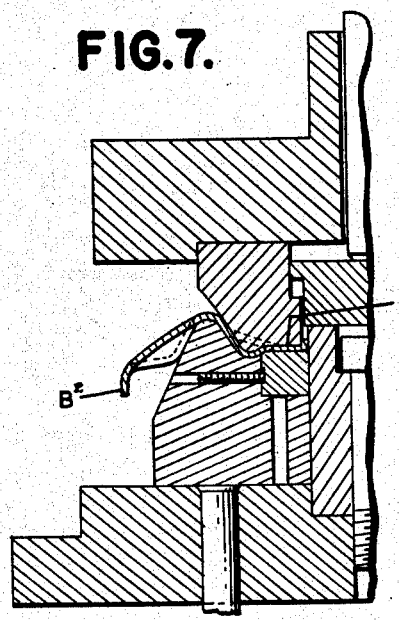

The wheel center is formed from a circular blank of sheet metal which is first pressed, as illustrated in Figure 3, to dish the same with the central portion A and peripheral portions B in parallel planes and connected by an oblique or conical portion C. In the next step (Figure 4) the blank is preferably reversed in position and pressed to bring the extreme peripheral portion B' down into substantially the plane of the central portion with an intermediate obliquely extending return-bent portion D. At the same time a circular series of pockets E are pressed into the portion D so as to leave intermediate said pockets rounded spoke portions F, shown in cross section in Figure 2A. In the succeeding step (Figure 5) the peripheral portion B' is turned downward to form an annular flange B² parallel with the axis of the blank and the other portions of the blank are re-struck to further refashion the same. The pockets E are next pierced (Figure 6) to form the apertures G but leaving portions H between said apertures and the flange B² at substantially right angles thereto. The center of the portion A is then pierced (Figure 7) to leave an annular flange A' forming the bolting-on flange of the wheel. The further operations of fashioning this flange and forming the bolt holes therein form no part of the present invention and therefore will not be described.

The wheel center formed as above described can be manufactured at low cost on account of the relatively small number of dies and separate operations required. In addition to the characteristics of a dished disk, the structure is strengthened by the corrugations or channel-shaped spoke sections F. The apertures G, in addition to giving the spoke appearance, lighten the structure by the removal of the unnecessary metal.

What we claim as our invention is:

1. In a method of forming pressed sheet metal wheel centers, the steps of dishing a circular sheet metal blank to form a central portion and a peripheral portion in spaced substantially parallel planes with an intermediate obliquely extending portion, re-pressing to bring the extreme peripheral portion into substantially the plane of the central portion and with the return-bent portion intermediate the same, pressing a series of pockets in said return-bent portion leaving intermediate the same rounded radially extending portions simulating spokes and turning the extreme peripheral portion to form an annular flange.

2. In a method of forming pressed sheet metal wheel centers, the steps of dishing a circular sheet metal blank to form a central portion and a peripheral portion in spaced substantially parallel planes with an intermediate obliquely extending portion, re-pressing to bring the extreme peripheral portion substantially into the plane of said central portion with an obliquely extending return-bent portion, and simultaneously pressing in said obliquely extending return-bent portion a circular series of pockets depressed to substantially the plane of the peripheral portion and with rounded radially extending portions intermediate said pockets simulating spokes and turning the extreme peripheral portion to form an annular flange.

3. In a method of forming pressed sheet metal wheel centers, the steps of dishing a circular sheet metal blank to form a central portion and a peripheral portion in spaced substantially parallel planes with an intermediate obliquely extending portion, re-pressing to bring the extreme peripheral portion substantially into the plane of said central portion with an obliquely extending return-bent portion, and simultaneously pressing in said obliquely extending return-bent portion a circular series of pockets depressed to substantially the plane of the peripheral portion and with rounded radially extending portions intermediate said pockets simulating spokes, turning the extreme peripheral portion to form an annular flange, and piercing the pocket portions to separate the spoke portions from each other.

4. In a method of forming pressed sheet metal wheel centers, the steps of dishing a circular sheet metal blank to form a central portion and a peripheral portion in spaced substantially parallel planes, reversely dishing the peripheral portion and forming a radially extending flange at the extreme periphery, pressing a circular series of pockets in the reversely dished portion leaving intermediate adjacent pockets rounded radially extending portions simulating spokes, and turning the extreme peripheral portion to form an annular flange.

5. In a method of forming pressed sheet metal wheel centers, the steps of dishing a circular sheet metal blank to form a central portion and a peripheral portion in spaced substantially parallel planes, reversely dishing the peripheral portion and forming a radially extending flange at the extreme periphery, pressing a circular series of pockets in said reversely dished portion and forming radial portions intermediate said pockets of a rounded channel cross section, piercing said pockets to separate the spoke portions from each other and piercing the central portion to form thereof an annular bolting-on flange.

6. In a method of forming pressed sheet metal wheel centers, the steps of dishing a circular sheet metal blank to form a central portion and a peripheral portion in spaced substantially parallel planes with an intermediate obliquely extending portion, re-pressing to bring the extreme peripheral portion into substantially the plane of the central portion and with a return-bent portion intermediate the same, pressing a series of pockets in said return-bent portion leaving intermediate said pockets radially extending portions simulating spokes.

7. In a method of forming pressed sheet metal wheel centers, the steps of dishing a circular sheet metal blank to form a circular portion and a peripheral portion in spaced substantially parallel planes, reversely dishing the peripheral portion and forming a radially extending flange at the extreme periphery thereof, pressing a circular series of pockets in the reversely dished portion leaving intermediate adjacent pockets rounded radially extending portions simulating spokes and piercing said pockets.

EDWIN A. BIERWIRTH.
HERMAN J. KIENLE.